United States Patent
Edwards et al.

(10) Patent No.: US 10,288,764 B2
(45) Date of Patent: May 14, 2019

(54) ESTIMATE OF SUBSIDENCE AND COMPACTION WITH BOREHOLE GRAVITY MEASUREMENTS

(71) Applicant: BAKER HUGHES, A GE COMPANY, LLC, Houston, TX (US)

(72) Inventors: Carl Edwards, Katy, TX (US); Mohamed Daoud, The Woodlands, TX (US); Sebastian Csutak, Houston, TX (US); Alexandr Nikolaevich Vasilevskiy, Novosibirsk (RU)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 2 days.

(21) Appl. No.: 15/519,008

(22) PCT Filed: Oct. 19, 2015

(86) PCT No.: PCT/RU2015/000685
§ 371 (c)(1),
(2) Date: Apr. 13, 2017

(87) PCT Pub. No.: WO2016/064301
PCT Pub. Date: Apr. 28, 2016

(65) Prior Publication Data
US 2017/0227672 A1 Aug. 10, 2017

Related U.S. Application Data

(60) Provisional application No. 62/066,073, filed on Oct. 20, 2014.

(51) Int. Cl.
*G06F 11/30* (2006.01)
*G01V 7/06* (2006.01)

(52) U.S. Cl.
CPC ................................... *G01V 7/06* (2013.01)

(58) Field of Classification Search
CPC ........................................................ G01V 7/06
See application file for complete search history.

(56) References Cited

U.S. PATENT DOCUMENTS 4,457,077 A * 7/1984 Lautzenhiser ........... G01V 7/08
33/304
5,705,812 A 1/1998 Brewer et al.
(Continued)

OTHER PUBLICATIONS

International Search Report and Written Opinion dated Mar. 10, 2016 of corresponding PCT/RU2015/000685.
(Continued)

*Primary Examiner* — Phuong Huynh
(74) *Attorney, Agent, or Firm* — Bracewell LLP; Keith R. Derrington (57) ABSTRACT

A method of estimating one or both of compaction or subsidence of a subterranean formation with gravity measurements. The free air gradient at surface is measured and compared with gravity measured in a borehole that intersects the formation. At a later point in time, values for gravity are re-measured, differences between the measured values at the initial point in time, and the later point in time are estimated. The differences are used to estimate the compaction or subsidence. A gravimeter can be used for measuring gravity, markers in the formation can be used in conjunction with the gravimeter.

19 Claims, 4 Drawing Sheets

(56) References Cited

U.S. PATENT DOCUMENTS

| | | | | |
|---|---|---|---|---|
| 5,753,813 A | * | 5/1998 | Hagiwara | E21B 47/09 |
| | | | | 166/254.2 |
| 2004/0182147 A1 | | 9/2004 | Rambow et al. | |
| 2009/0223291 A1 | * | 9/2009 | Donadille | E21B 43/16 |
| | | | | 73/32 R |
| 2010/0107753 A1 | * | 5/2010 | Bourne | G01V 11/00 |
| | | | | 73/152.39 |
| 2014/0165720 A1 | * | 6/2014 | Edwards | G01V 7/00 |
| | | | | 73/382 R |

OTHER PUBLICATIONS

International Preliminary Examination Report on Patentability dated May 4, 2017 for corresponding PCT/RU2015/000685.

* cited by examiner

ESTIMATE OF SUBSIDENCE AND COMPACTION WITH BOREHOLE GRAVITY MEASUREMENTS

CROSS REFERENCE TO RELATED APPLICATION

This application is a U.S. National Stage Application of International Application No. PCT/RU2015/000685 filed Oct. 19, 2015, and further claims priority from United States Provisional Application No. 62/066,073 filed Oct. 20, 2014. The subject international application designates the United States and which is incorporated herein by reference in its entirety and for all purposes.

BACKGROUND OF THE INVENTION

1. Field of Invention

The present disclosure relates to a method of measuring subsidence and compaction with a gravimeter. More specifically, the present disclosure relates to a method of measuring subsidence and compaction by measuring gravitational forces at locations in a wellbore over time.

2. Description of Prior Art

Hydrocarbons from subterranean strata are typically produced from formations in the strata by forming wells that intersect one or more of the formations. Pressure in the reservoir and the stress in the rock balance the overburden pressure and the reservoir stays in equilibrium and maintains its shape. Due to the production of fluids from the subterranean formation, such as water and/or hydrocarbon trapped in the formation, pressure in the formation is reduced. If strength of the rock is insufficient, the rock strain is increased in the vertical direction causing compaction within the reservoir.

Compaction is sometimes estimated by measuring the change in distance between two or more features or markers in the formation. These features are usually radioactive "bullets" shot through the casing into the formation. This distance between markers is measured by a tool with multiple detectors. Distances between adjacent features that are much larger or smaller than accuracy of the detectors requires moving the tool, which is usually deployed on wireline. The inherent elasticity of wireline reduces the accuracy with which the feature distance can be estimated.

Subsidence typically refers to a change in depth or elevation of the earth that is above the reservoir. Subsidence can be caused by fluid withdrawal from a reservoir, but there are other mechanisms. Above a reservoir, subsidence is generally not accompanied by compaction. However, within the reservoir, compaction and subsidence may occur at the same depth. Methods for measuring subsidence at the surface include tracking the elevation of a global positioning satellite ("GPS") receiver; where the receiver can be mounted permanently at the surface or stationed periodically at the same location. For greater accuracy, a difference method using two GPS receivers can be used. One drawback of GPS is that it is not operational below the surface.

SUMMARY OF THE INVENTION

Disclosed herein are example methods of estimating compaction in a formation, where in one embodiment the method includes obtaining a first initial value of gravity from a first location in the formation, and which represents the force of gravity at the first location at an initial time, obtaining a second initial value of gravity at a second location that is spaced vertically away from the first location, and which represents the force of gravity at the second location at about the initial time. The method further includes comparing the first and second initial values of gravity to obtain an initial difference in gravity values, obtaining a first later in time value of gravity from the first location, and which represents the force of gravity at the first location at a point in time later than the initial time, obtaining a second later in time value of gravity from the second location, and which represents the force of gravity at the second location at a point in time later than the initial time, obtaining a later point in time difference in gravity value by comparing the first and second later in time values of gravity, and estimating formation compaction by comparing the initial difference in gravity values and the later point in time difference in gravity values. The method can further include dividing the initial difference in gravity values and the later point in time difference in gravity values by the free air constant. Alternatively, estimating formation compaction can be further based on the gravitational constant G and density of fluid that is in the portion of the formation undergoing compression. In another example, the step of estimating formation compaction further considers changes in porosity of the formation being compaction and changes of density of the fluid in the formation being compaction. Yet further optionally, the step of estimating formation compaction further considers changes in the free air constant. In one alternative, the first location is along a wall of a borehole that intersects the formation. The second location can be a bottom of a borehole that intersects the formation, along a sidewall of the borehole, or on the earth's surface and outside of the borehole. The method can further include providing markers at the first and second locations, and providing additional markers at locations spaced vertically away from the first and second locations, and measuring values of gravity at the additional markers at the initial time and at points in time later than the initial time. The values of gravity can be obtained with a gravimeter that is disposed in a downhole tool.

Another example method of estimating compaction in a formation includes obtaining values of gravity from vertically spaced apart locations at an initial time and at a later time, and where at least one of the locations is in the formation, obtaining an initial difference in gravity values between the spaced apart locations at the initial time, obtaining a later difference in gravity values between the spaced apart locations at the later time, and estimating an amount of compaction in the formation based on a comparison of the initial and later difference in gravity values. The step of estimating an amount of compaction can optionally include dividing a difference of the initial and later difference in gravity values by the free air constant. In one example, the step of estimating formation compression is further based on the gravitational constant G and density of fluid that is in the portion of the formation undergoing compression. Yet further optionally, the step of estimating formation compression further considers changes in porosity of the formation being compressed, and changes of density of the fluid in the formation being compressed. The method of estimating formation compression can further consider changes in the free air constant. The gravity measurements can be taken within a borehole that intersects the formation. The gravity measurement not obtained in the formation can be obtained on the earth's surface above the formation. The gravity measurements may optionally be obtained with a gravimeter disposed in a downhole tool.

Another method of estimating compaction in a formation includes measuring gravity at vertically spaced apart locations in a borehole that intersects the formation to obtain an initial gravity difference, remeasuring gravity at the vertically spaced apart locations at a point later in time to obtain a later in time gravity difference, and estimating compaction using the following relationship $C=(\Delta g_o - \Delta g_T)/(F-4\pi G \rho_f)$, where C is the amount of compaction, $\Delta g_o$ is the initial gravity difference, $\Delta g_T$ is the later in time gravity difference, F is the free air constant, G is the gravity constant, and $\rho_f$ is a density of the fluid in the formation being compacted. The method can further include considering changes in porosity of the formation being compacted and changes of density of the fluid in the formation being compacted.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
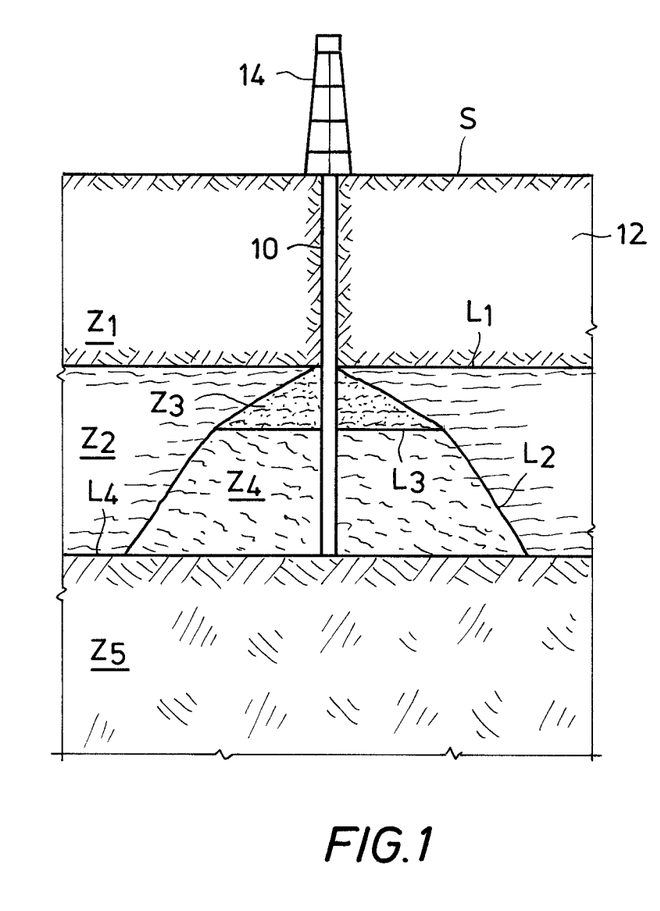
FIG. 1 is a side sectional view of an example of a formation intersected by a borehole and having multiple zones.
Figure 2:
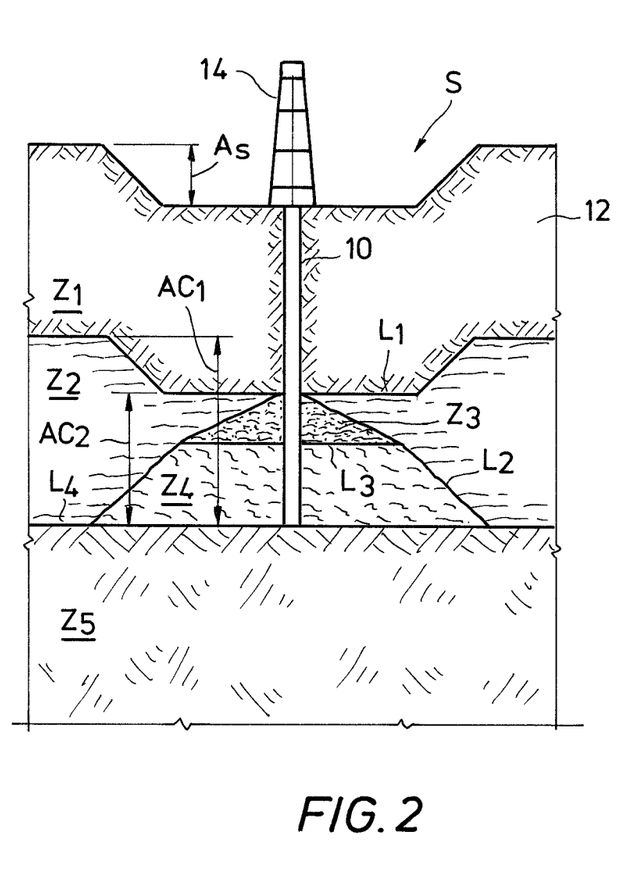
FIG. 2 is a side sectional view of the formation of FIG. 1 after a period of time and having experienced subsidence and compaction.

Referring to FIG. 1, an example is shown in side sectional view of a wellbore 10 that projects downward into a subterranean formation 12. A derrick 14 is mounted on surface S and over wellbore 10. Included in the formation are zones $Z_1$, $Z_2$, $Z_3$, $Z_4$, $Z_5$ that are also intersected by wellbore 10. Zones $Z_1$, $Z_2$, $Z_3$, $Z_4$, $Z_5$ are separated from one another by boundary lines $L_1$, $L_2$, $L_3$, $L_4$. In one example FIG. 1 illustrates the formation 12 prior to fluid production, and where pressure in the reservoir and stress in the rock balance the overburden pressure and the reservoir stays in equilibrium and maintains its shape. As illustrated in FIG. 2, subsidence and compaction can occur within the formation 12 over time due to fluids being produced from the formation 12. Removing fluid from the reservoir lowers reservoir pressure, and if the rock strength is insufficient to support the weight of formation above it, rock strain is increased vertically to cause compaction in the reservoir. Compaction rates as measured over a nominal 10 meter interval can be as high as 50 mm/year, but are more typically 0.5 mm/year. (Mirzwinski, 2014). Subsidence, as illustrated by arrow $A_S$, causes a lowering of the surface S. Similarly in the example illustrated, compaction, which can be represented by a difference in arrows $A_{C1}$, $A_{C2}$, results in a shift in lines $L_1$, $L_2$, $L_3$, and compression of zones $Z_1$, $Z_2$, $Z_3$, $Z_4$.

Figure 3:
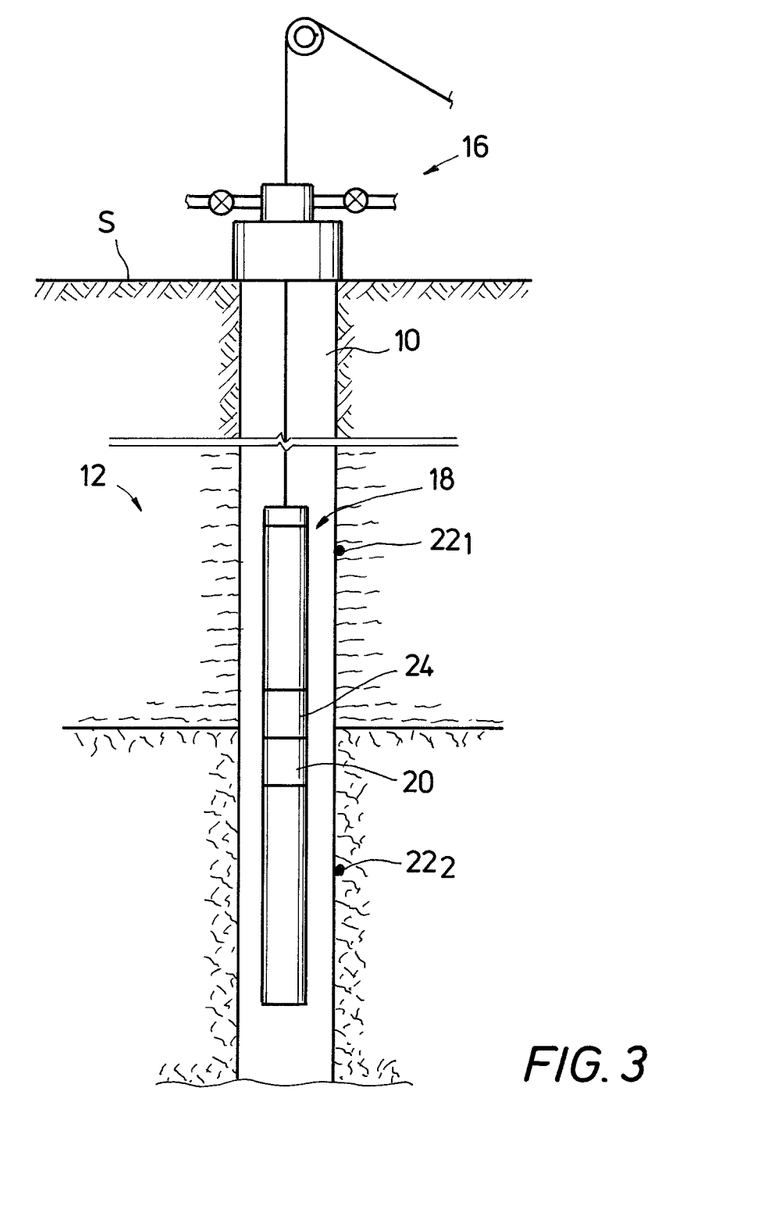
FIG. 3 is a side sectional view of an example of using a gravimeter to measure gravity in the borehole of FIG. 1.

FIG. 3 is a side sectional example of the formation 12 and wellbore 10 of FIGS. 1 and 2. Optionally a wellhead assembly 16 is over the wellbore 10 instead of the derrick 14 (FIG. 2). A wellbore tool 18 is shown inserted into the wellbore 10, and which includes a gravimeter 20. An example of a gravimeter for use with what is described in the present disclosure can be found in Edwards et al., U.S. Patent Application Publication No. 2012/0271549, having Ser. No. 13/449,788, filed Apr. 18, 2012, and assigned to the assignee of the present application; and which is incorporated by reference herein in its entirety for all purposes. Markers $22_1$, $22_2$, are shown illustrated in the formation 12 at known depths and spaced axially apart at different depths in the wellbore 10. Markers $22_1$, $22_2$, can also be referred to as features; and examples exist wherein material for the markers $22_1$, $22_2$ includes radioactive material, such as bullets. Alternatively, the $22_1$, $22_2$, can be in collars of tubulars disposed downhole, as well as large rapid changes as a function of depth of the intensity of naturally emitted gamma-rays that typically occur at the boundary between sandstone and shale rock types or other reservoir features. Other suitable formation features will be apparent to those of ordinary skill in the art. A sensor sub 24 in the tool 18 is equipped with sensors (not shown) for detecting the proximity of the markers $22_1$, $22_2$. Example sensors include radiation detectors, seismic receivers, electro-magnetic wave sensors, and the like. Measurement of the compaction shown in FIG. 2 can be estimated with the system illustrated in FIG. 3. In an example of use, a free air gradient, such as that described above, is measured at surface S. Gravity at vertically spaced apart locations is measured, where at least one of the locations is within the formation, and a difference between the measured values of gravity is obtained. In one example, the locations are in the wellbore 10, such as at markers $22_1$, $22_2$. At a point in time later, which can be hours, days, weeks, months, or years, gravity at the aforementioned locations in the wellbore 10 (i.e. at markers $22_1$, $22_2$) is re-measured and another difference between the measured values of gravity is obtained. An analysis of the differences between the gravity values over time can yield a change in spacing between the markers $22_1$, $22_2$, which in turn can be used to estimate compaction, a rate of compaction, subsidence, or a rate of subsidence in the formation 12.

The differences in gravity can be obtained by measurements at the markers $22_1$, $22_2$ alone, one of the markers $22_1$, $22_2$ and at or above surface S, or both markers $22_1$, $22_2$ and at or above surface S. One of the advantages of the method and system described herein is that compaction can be measured without contacting the formation 12, and without the need to insert a probe or other invasive instrument into the formation 12 during the step of measuring. Additional advantages of the method and system described herein include the ability to estimate compaction, a rate of compaction, subsidence, or a rate of subsidence in the formation, without the need for radioactive material or any type of ballistics. Moreover, the disclosed method and system can be used to measure compaction over intervals of less than 10 meters and in excess of 100 meters, and is not limited to spacing constraints.

Figure 4A:
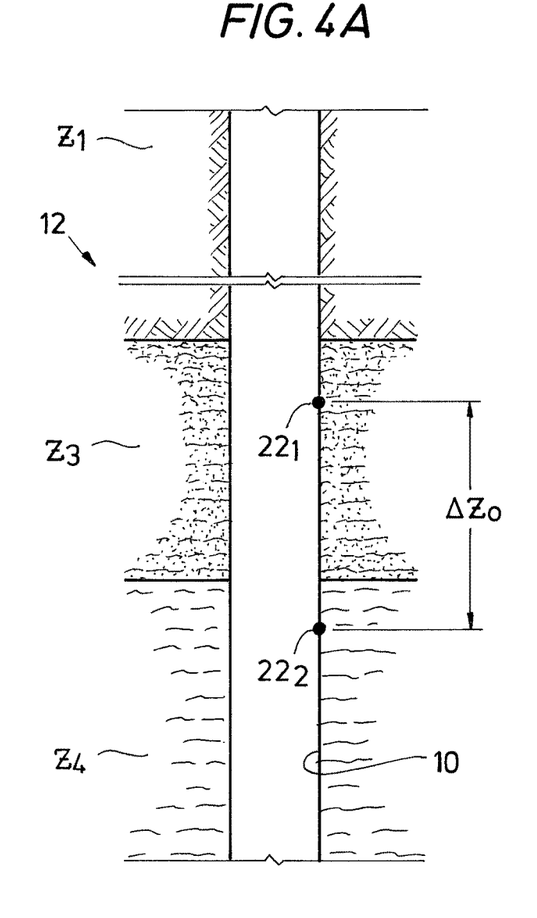
FIGS. 4A and 4B are side sectional views of an example of a wellbore before and after compaction.
Figure 4B:
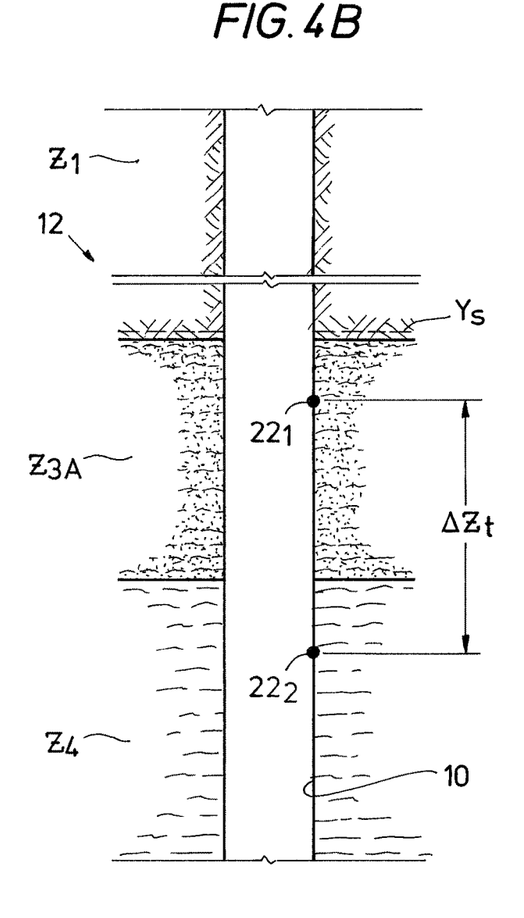

FIGS. 4A and 4B provide side sectional illustrations of how the distance between markers $22_1$, $22_2$ can change over time when compaction takes place in the formation 12. More specifically, depicted in FIG. 4A are markers $22_1$, $22_2$ disposed in the formation 12, and where $\Delta Z_o$ represents a vertical distance between marker $22_1$ and marker $22_2$ at an initial point in time. Further illustrated in this example is that marker $22_1$ is in zone $Z_3$, and marker $22_2$ is in zone $Z_4$. FIG. 4B depicts how the vertical distance between the markers $22_1$, $22_2$ has changed at a point in time, which occurs after the initial point in time as represented in FIG. 4A. In the example of FIG. 4B, some compaction has taken place in the formation 12 within zone $Z_3$, which results in some subsidence $Y_S$, which in turn creates an elevational drop in the upper boundary of zone $Z_3$.

As provided above, in one example compaction in the formation 12 is estimated by measuring a change in the gravity differences between the markers $22_1$, $22_2$ caused by the compaction. Equation (1) below provides an example relationship for compaction where it is assumed that no fluid flows from the formation being compacted:

$$C = (\Delta g_o - \Delta g_T)/F. \tag{1}$$

In Equation (1) C represents compaction in meters; $\Delta g_o$ represents a difference in gravity between markers $22_1$, $22_2$ prior to compaction (at the initial point in time); $\Delta g_T$ represents a difference in gravity between markers $22_1$, $22_2$ after compaction (after the initial point in time); and F represents the free air gradient. In an embodiment, the free air gradient F is assumed to be a constant 3.086×10-6 uGal/(m×s$^2$). Here the layered earth model is being used for gravity near the Earth's surface such that:

$$\Delta g = (F\Delta Z - B) \tag{1.1}$$

In Equation (1.1) B is the Bouguer term. It represents the gravity caused by a horizontal slab of earth between two measurements points. It is $$B = 4\pi G \int_{ZZ_1}^{ZZ_2} \rho(z)dz, \tag{1.2}$$

Where G represents the gravitational constant (6.674×10-11 Nm$^2$ kg$^{-2}$); and $\rho$ represents density between the two measurement point either before or after compaction. Here it is assumed that no fluid flowing out during compaction is equivalent to a situation that the total mass between the measurement points is conserved and the Bouguer term is constant.

Eqn. (1) represents an example of a first approximation to compaction. But fluids often do flow from reservoirs during compaction. In fact, "compaction drive accounts a significant fraction of the produced fluids in the Ekofisk formation. Fertl, W., G. V. Chilingarian, et al. (1995). Surveillance Technology To Detect And Monitor Compaction And Subsidence Effects. Subsidence Due to Fluid Withdrawal. G. V. Chilingarian, E. C. Donaldson and T. F. Yen, Elsevier: 439. DOI:10.1016/S0376-7361(06)80057-9; and Sulak, R. M. and J. Danielsen (1989). "Reservoir Aspects of Ekofisk Subsidence." Journal of Petroleum Technology 41(7). DOI: 10.2118/17852-PA.

To improve the approximation for compaction, several cases can be considered. In one example the case to consider is when the density of the fluid flowing from the reservoir is constant over time. This might be the case for compaction of a water zone in a reservoir or compaction in an aquifer. Equation (2) below provides the relationship for when fluid density flowing from the reservoir remains constant over time.

$$C = (\Delta g_o - \Delta g_T)/(F - 4\pi G \rho_f). \tag{2}$$

Where $\rho_f$ represents fluid density. Thus in the example where compaction C is estimated using Equation (2), the density of the fluid flowing out of the formation 12 during compaction is also estimated. Estimation of the fluid density is within the capabilities of those of ordinary skill in the art. The term $4\pi G\rho_f$ accounts for fluid outflow during the compaction process as the Bouguer term before compaction is different from the Bouguer term after compaction. The mass between the measurement points is no longer conserved. What is conserved is the mass of the solid matrix. This includes all of the minerals and perhaps some classes of organic material such as kerogen.

Figure 5:
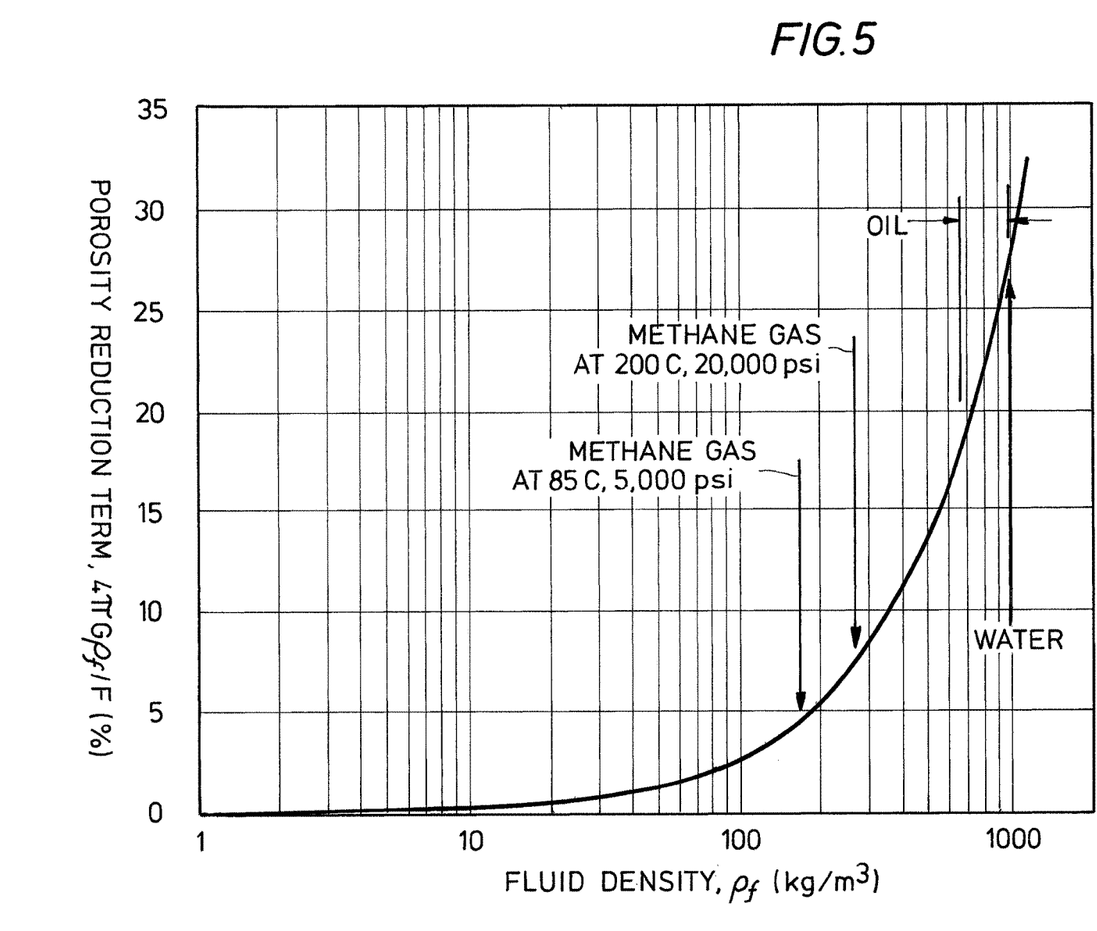
FIG. 5 is a graphical illustration of an example of a relationship between a porosity reduction term and fluid density.

Graphically illustrated in FIG. 5 is an example plot that compares the size of $4\pi G\rho_f$ to the free-air gradient F. For water, the terms is about 30% of the free-air gradient. For oils, its value is somewhat less: between 20% and 30%. For methane gas it is less than 10%.

In another approximation, an outflow of fluids is considered, as well as a change in fluid density during compaction. Cases where this approximation might be needed are for oil or gas reservoirs that are under pressure drive. Another case might be a water fluid in which water is replacing oil. In this example of estimating compaction:

$$C = (\Delta g_o - \Delta g_T + 4\pi G \Delta \rho_f \varphi' \Delta Z_o)/(F - 4\pi G(\rho_f - \Delta \rho_f \varphi')). \tag{3}$$

Where $\Delta Z_o$ represents a depth difference between the markers $22_1$, $22_2$ prior to compaction; and $\varphi'$ represents porosity in the formation 12 after compaction. In this approximation two addition terms are included, which are proportional to the porosity after compaction and the change in density of the fluids. If the change in density is small these terms may be safely ignored. Thus in the example wherein Equation (3) is implemented to estimate compaction C, porosity of the formation 12 is evaluated, which is also within the capabilities of those of ordinary skill in the art. Those skilled in the art may also find equivalent expressions for Equation (3) that use the porosity before compaction and/or the distance between markers after compaction.

Equation 4 below provides a relationship for estimating compaction that considers fluid flowing from the formation 12 during compaction, a change in fluid density, and a change in the free air gradient. Tectonic events, such as an earthquake, can affect the free air gradient.

$$C = (\Delta g_o - \Delta g_T - (\Delta F - 4\pi G \Delta \rho_f \varphi')\Delta Z_o)/(F_T - 4\pi G(\rho_f - \Delta \rho_f \varphi')). \tag{4}$$

Where $F_T$ represents the free air gradient at a time T after the initial period of time, and that can be after the formation 12 has been compacted; and ΔF represents a difference in the free air gradient F between the initial time and a time T after the initial period of time. Where the relationship outlined in Equation 4 is used to estimate compaction C, values of the free air gradient F are obtained, another step which is within the capabilities of one of ordinary skill in the art.

In addition to measuring compaction, estimates of subsidence within the formation can be made when one of the measurement points (i.e. markers or features) is fixed over time, or when its change in position is well known. An example of the former is the use of any point that is below the production zones of the reservoir, such as at the bottom of the well. An example of the later is the use of a point at the well head, where its movement can be quantified by global positioning satellite ("GPS") or other common means of measuring subsidence.

Finally, it is to be noted that Equations (2) through (4) use single values for density and porosity. This can be deemed equivalent to assuming that the reservoir between the measurement points is a single uniform layer. Equations (2) though (4) can be generalized to multiple layers simply by replacing the density and porosity with the depth averaged quantities of those values.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, an array of quad sensors for downhole use can be included in place of, or included with, the gravimeter. Further, the number of markers or features disposed in the wellbore can be more than two. Additionally, the markers can be congregated within a single zone in the formation, or spread among more than one zone. These and other similar modifications will readily suggest themselves to those skilled in the art, and are intended to be encompassed within the spirit of the present invention disclosed herein and the scope of the appended claims.

What is claimed is:

1. A method of wellbore operations comprising:
   a. obtaining a first initial value of gravity from a first location in the formation, and which represents the force of gravity at the first location at an initial time;
   b. obtaining a second initial value of gravity at a second location that is spaced vertically away from the first location, and which represents the force of gravity at the second location at about the initial time;
   c. comparing the first and second initial values of gravity to obtain an initial difference in gravity values;
   d. obtaining a first later in time value of gravity from the first location, and which represents the force of gravity at the first location at a point in time later than the initial time;
   e. obtaining a second later in time value of gravity from the second location, and which represents the force of gravity at the second location at a point in time later than the initial time;
   f. obtaining a later point in time difference in gravity value by comparing the first and second later in time values of gravity;
   g. estimating formation compaction by comparing the initial difference in gravity values and the later point in time difference in gravity values; and
   h. optimizing hydrocarbon recovery from the formation based on estimated values of compaction.

2. The method of claim 1, further comprising dividing the initial difference in gravity values and the later point in time difference in gravity values by the free air constant.

3. The method of claim 2, wherein the step of estimating formation compaction is further based on the gravitational constant G and density of fluid that is in the portion of the formation undergoingcompaction.

4. The method of claim 3, wherein the step of estimating formation compaction further considers changes in porosity of the formation being compaction and changes of density of the fluid in the formation being compaction.

5. The method of claim 4, wherein the step of estimating formation compression further considers changes in the free air constant.

6. The method of claim 1, wherein the first location is along a wall of a borehole that intersects the formation.

7. The method of claim 1, wherein the second location comprises a place selected from the group consisting of a bottom of a borehole that intersects the formation, along a sidewall of the borehole, and on the earth's surface and outside of the borehole.

8. The method of claim 1, further comprising providing markers at the first and second locations, and providing additional markers at locations spaced vertically away from the first and second locations, and measuring values of gravity at the additional markers at the initial time and at points in time later than the initial time.

9. The method of claim 1, wherein the values of gravity are obtained with a gravimeter that is disposed in a downhole tool.

10. A method of wellbore operations comprising:
    a. obtaining values of gravity from vertically spaced apart locations at an initial time and at a later time, and where at least one of the locations is in the formation;
    b. obtaining an initial difference in gravity values between the spaced apart locations at the initial time;
    c. obtaining a later difference in gravity values between the spaced apart locations at the later time;
    d. estimating an amount of compaction in the formation based on a comparison of the initial and later difference in gravity values; and
    e. drilling in the formation based on the estimated amount of compaction.

11. The method of claim 10, wherein the step of estimating an amount of compaction includes dividing a difference of the initial and later difference in gravity values by the free air constant.

12. The method of claim 11, wherein the step of estimating formation compression is further based on the gravitational constant G and density of fluid that is in the portion of the formation undergoing compression.

13. The method of claim 12, wherein the step of estimating formation compression further considers changes in porosity of the formation being compressed and changes of density of the fluid in the formation being compressed.

14. The method of claim 13, wherein the step of estimating formation compression further considers changes in the free air constant.

15. The method of claim 10, wherein the gravity measurements are taken within a borehole that intersects the formation.

16. The method of claim 10, wherein the gravity measurement not obtained in the formation is obtained on the earth's surface above the formation.

17. The method of claim 10, wherein the gravity measurements are obtained with a gravimeter disposed in a downhole tool.

18. A method of estimating compaction in a formation comprising:
   a. measuring gravity at vertically spaced apart locations in a borehole that intersects the formation to obtain an initial gravity difference;
   b. remeasuring gravity at the vertically spaced apart locations at a point later in time to obtain a later in time gravity difference;
   c. estimating compaction using the following relationship $C=(\Delta g_o - \Delta g_T)/(F - 4\pi G \rho_f)$, where C is the amount of compaction, $\Delta g_o$, is the initial gravity difference, $\Delta g_T$ is the later time gravity difference, F is the free air constant, G is the gravity constant, and $\rho_f$ is a density of the fluid in the formation being compacted; and
   d. optimizing hydrocarbon recovery from the formation based on the estimated compaction.

19. The method of claim 18, further comprising considering changes in porosity of the formation being compressed and changes of density of the fluid in the formation being compressed.

\* \* \* \* \*